Patented Nov. 2, 1948

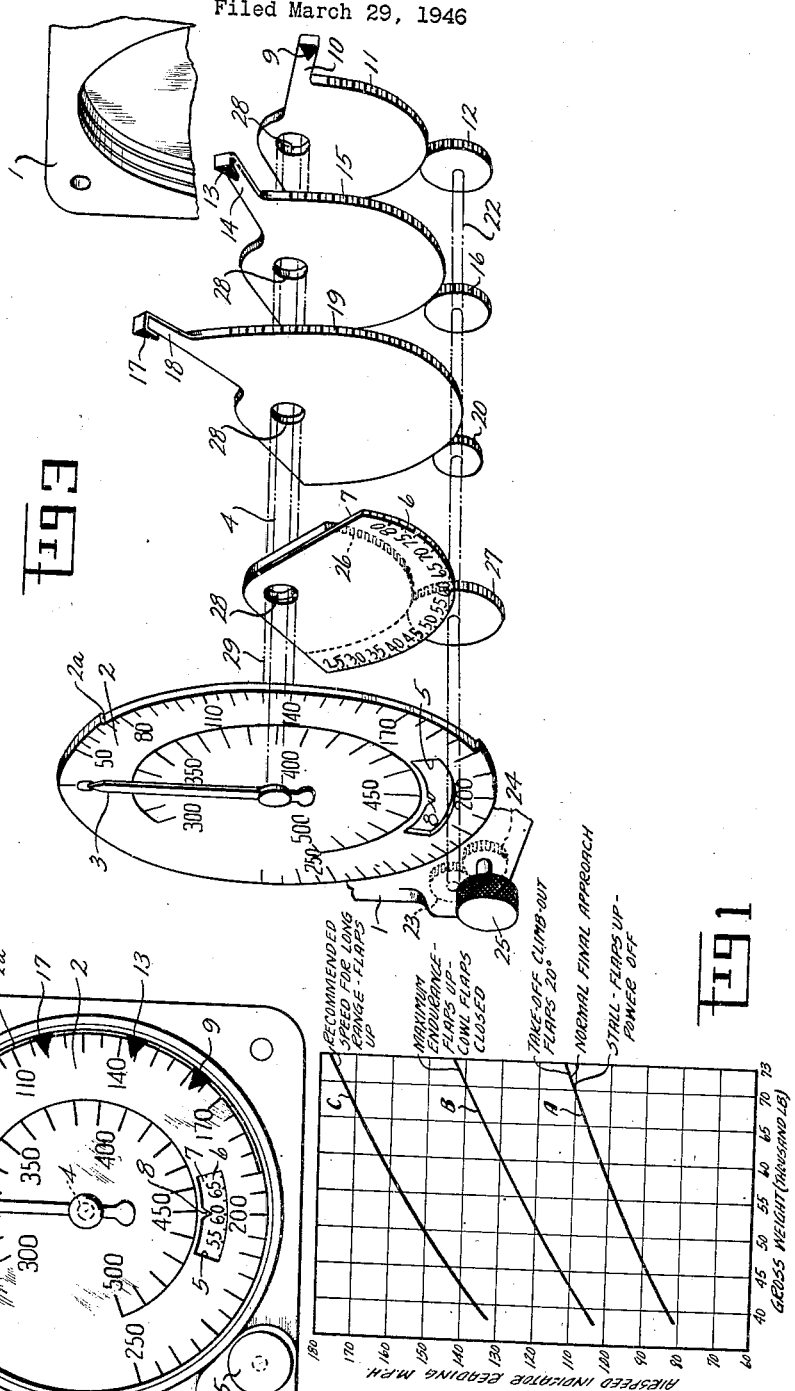

2,452,621

UNITED STATES PATENT OFFICE 2,452,621

FLIGHT-OPERATION INDICATOR

Joseph Weissenbach, Los Angeles, Calif.

Application March 29, 1946, Serial No. 658,190

4 Claims. (Cl. 73—178)

(Granted under the act of March 3, 1883, as amended April 30, 1928; 370 O. G. 757)

The invention described herein may be manufactured and used by or for the Government for governmental purposes without payment to me of any royalty thereon.

The present invention relates to a novel flight operation indicator for aircraft in which visual indication of the proper airspeed for conducting various flight operations under conditions of varying gross weights are given directly in relation to the indicated airspeed.

The various flight performance criteria, such as airspeed to fly at various gross weights to obtain maximum endurance, minimum airspeed for take-off with various gross weights, etc., are currently included in tables appended to the flight operation manuals furnished with the airplane, but are inconvenient for pilots to use particularly where no pre-computed flight plan has been made.

In accordance with the present invention a plurality of indicators are provided cooperating with the dial of an airspeed indicator. The indicators are respectively set by a setting knob which also operates a gross weight scale which moves relative to a stationary pointer. When the gross weight scale indicia is set opposite the reference index or pointer indicating the present gross weight of the airplane, the various indicators are automatically set to indicate the respective airspeeds for selected flight operation conditions. By maintaining the airspeed at the desired value the airspeed indicator pointer will overlie or be in alignment with the indicator corresponding to the desired flight condition and deviations therefrom will be readily visually apparent. By knowing the initial gross weight and approximate power output requirements the fuel consumption and hence the change in gross weight may be readily computed and the indicators reset from time to time to correspond to the existing gross weight.

It is, therefore, an object of the invention to provide, in conjunction with an airspeed indicator, auxiliary indicators cooperating with the airspeed indicator dial to indicate various flight performance criteria in terms of airspeed, a separate settable pointer and pointer and gross weight scale and pointer and a common setting means for adjustably setting the gross weight scale and the auxiliary indicators.

Other objects and features of the invention will become apparent by reference to the detailed description hereinafter given and to the appended drawings in which:

Fig. 1 is a graphical illustration of the variation in airspeed of certain flight operation criteria with variation in gross weight of a well-known four-engine cargo airplane which illustrate the design basis of an instrument in accordance with the invention, and Fig. 2 illustrates in front elevation an airspeed indicator incorporating the invention, and Fig. 3 is an exploded perspective view illustrating the manner of construction and operation of the gross weight and auxiliary or flight condition indicators.

Referring to Fig. 1, which is a characteristic speed chart for a four-engine cargo airplane having a normal gross weight varying between 35 and 73 thousand pounds, the chart illustrates the variation in recommended operating airspeed for three flight operating conditions. The curve indicated by reference character A indicates the variation in recommended airspeed for take-off and climb-out with wing flaps set 20° down and also indicates normal final approach speed with flaps set at 40° down and further represents the stalling speed with wing flaps up and power off, as the gross weight varies. It is seen from curve A that climb-out airspeed should vary from 83 M. P. H. for a gross weight of 40,000 lbs. to 112 M. P. H. for a gross weight of 73,000 lbs. Curve B represents the variation in recommended airspeed to obtain maximum endurance and varies between 105 M. P. H. and 142 M. P. H. for a gross weight change above indicated. Curve C indicates the variation in recommended airspeed for maximum range as varying from 135 to 178 M. P. H. for the gross weight variation above noted. While curve C is not a straight line, a straight line variation may be assumed with small error. While the performance curves B and C will vary with altitude there will be one altitude most practical for range and endurance and curves for this altitude will be the most suited for the purposes of the invention.

The manner in which the invention is carried out will be apparent by reference to Figs. 2 and 3. As seen in these figures the reference numeral 1 indicates the case of a conventional airspeed indicator adapted to be actuated by differential pressure when connected to a conventional Pitot-static airspeed indicator head (not shown).

The airspeed indicator 1 has a uniformly divided airspeed dial 2 which cooperates with a pointer 3 actuated by a pointer shaft 4 which is rotated by the differential pressure responsive mechanism (not shown). The pointer 3 indicates relative to the airspeed indicia on dial 2 the instant value of the airspeed during flight. An arcuate opening 5 is provided in the dial 2 and serving as a window through which gross weight indicia 6 on a rotatable indicator plate 7 are observed relative to a stationary index projection or pointer 8 depending from the window opening 5.

Indicators or flags 9, 13 and 17 overlie the peripheral portion of the dial 2 and movable through an arcuate recess (2a) at the peripheral portion of the dial, note Fig. 3.

Referring to Fig. 3 the indicator tabs 9, 13 and 17 are seen to be bent over portions of arms 10, 14 and 18 respectively, which are integral with sector gears 11, 15 and 19 which mesh with pinion gears 12, 16 and 20 respectively. The pinions 12, 16 and 20 are rigidly secured to an actuating or setting shaft 22 adapted to be manually rotated by means of reduction gears 23 and 24, the latter being actuated by a setting knob 25 positioned in front of the instrument casing. The arcuate plate 7 carrying the gross weight indicia 6 is provided with gear teeth 26 which mesh with a further pinion gear 27, also rigidly mounted on shaft 22 to rotate therewith. The sector gears 11, 15 and 19 and indicator plate 7 are each provided with hub bores 28 so that they may be rotatably supported on a hollow pivot stud 29 supported from the rear face of dial 2 and through which the pointer shaft 4 extends for independent operation by the airspeed indicator mechanism.

If the angular extent of the gross weight scale on plate 7 is such as to cover 90° for a range of gross weights of from say 40,000 to 73,000 lbs., then indicator 17 which indicates variation in climb-out airspeed (curve A of Fig. 1) should rotate over the airspeed indicator scale indicia from 83 M. P. H. to 112 M. P. H., or approximately 26°. The ratio between pinion 20 and sector gear 19 is, therefore, selected to give the proper speed reduction. The ratio between gears 15, 16 and 11, 12 respectively, are arranged such that indicator 13 corresponding to curve B, Fig. 1, moves over the airspeed indicia from 105 to 142 M. P. H., or 33°, and indicator 9 corresponding to curve C moves from 135 to 178 M. P. H., or 39°, for same angular movement of the gross weight indicator scale.

The indicator tabs 9, 13 and 17 are each painted a distinctive color and a legend strip is affixed to the aircraft instrument board giving the interpretation of the indication of the auxiliary indicators.

*Operation*

The pilot prior to starting a flight determines the gross weight of the airplane from the load schedule and rotates knob 25 until the starting gross weight indicia of say 60 thousand pounds appears opposite index 8 in window 5 of the airspeed indicator dial, indicator 17 should then be at 102 M. P. H. indicating the safe take-off and climb-out airspeed for this weight and during take-off the airspeed pointer should be opposite indicator 17. Indicator 13 should be at the 130 M. P. H. indicia to indicate the airspeed for maximum endurance at the existing gross weight and similarly indicator 9 should indicate 162 M. P. H. as the airspeed for long range. Knowing the engine power output the fuel consumption in gallons and pounds per hour may be determined and the new gross weight computed at various times during the flight and the instrument reset accordingly and the airspeed indicator pointer kept opposite the selected auxiliary indicator. At the end of the flight, indicator 13 will approximately indicate the safe maneuvering approach airspeed with flaps set at 20° down and indicator 17 will indicate the normal final approach speed with flaps at 40° down and will also indicate the stalling speed with flaps up and power off. It is thus apparent that indicating means are provided to enable the pilot to determine the desired performance criteria and by keeping the airspeed pointer opposite the respective indicators can safely take-off, fly a mission at airspeeds to maintain maximum endurance or range and can make a safe approach and let down at the point of landing.

It will be understood that each instrument will be suitable only for a specific type airplane but the only difference from type to type will be the variation in gear ratios for the various auxiliary pointers. Where the performance curves of the type shown in Fig. 1 vary considerably from straight lines, compensating cams may be employed for actuating the auxiliary indicators to indicate airspeeds in a non-linear manner as a function of gross weight and other flight conditions than those illustrated in Fig. 1 may be represented by additional indicators.

While one form of the invention has been illustrated and described, other modifications and variations therein will become apparent to those skilled in the art as coming within the scope of the invention as defined in the appended claims.

I claim:

1. An instrument for indicating the desired airspeed for efficient flight operation of an aircraft for varying gross weight conditions, comprising an airspeed indicator having a dial with airspeed indicia thereon and a pointer movable thereover, a plurality of auxiliary indicators movable about the pointer axis and cooperating respectively with the indicia on said dial to indicate the desired airspeeds for different flight conditions under variable gross weight conditions, a scale calibrated in terms of gross weight, an indicator cooperating therewith said scale and indicator being relatively movable for setting to indicate the existing gross weight of the aircraft, a setting means for said gross weight scale and means actuated by said setting means for rotating said auxiliary indicators to the respective airspeed values corresponding to the selected gross weight setting, alignment of the airspeed pointer with a respective one of said auxiliary indicators indicating that the existing airspeed corresponds to the desired efficient airspeed for the selected flight condition.

2. The structure as claimed in claim 1, in which the respective auxiliary indicators and the gross weight scale are operatively connected to the setting means by gearing such that the angular movement of the respective auxiliary indicators respectively bear a fixed relation to the angular movement of the gross weight scale.

3. The combination with an airspeed indicator having an airspeed dial and cooperating pointer, an auxiliary indicator movable relative to the dial and cooperating with the pointer to indicate the attainment of a desired airspeed for a definite flight operation condition, which desired airspeed varies as a function of the gross weight of the airplane, a gross weight indicating means for visually indicating the gross weight of the airplane and manual setting means for simultaneously actuating the auxiliary indicator and the gross weight indicating means such that the movement of the auxiliary pointer between predetermined points relative to the airspeed dial is in a predetermined ratio to the indication of the gross weight indicating means.

4. In an airspeed indicator having a dial with airspeed graduations and a cooperating pointer adapted to indicate the instant value of airspeed, auxiliary indicators respectively movable over zones of the airspeed dial graduations such that coincidence of the pointer with the respective auxiliary indicators indicates that the instant airspeed corresponds to the desired airspeed for a selected flight performance condition, a gross weight indicating means settable for indicating the gross weight of the aircraft, gearing interconnecting the auxiliary indicators and the gross weight indicating means such that the settings of the auxiliary indicators bear a functional relation to the setting of the gross weight indicating means, and manual means for actuating the gearing.

JOSEPH WEISSENBACH.

REFERENCES CITED

The following references are of record in the file of this patent:

UNITED STATES PATENTS

| Number | Name | Date |
| --- | --- | --- |
| 2,023,825 | Urfer | Dec. 10, 1935 |
| 2,137,194 | Weber | Nov. 15, 1938 |
| 2,152,635 | Crane et al. | Apr. 4, 1939 |
| 2,258,826 | Torkelson | Oct. 14, 1941 |